United States Patent
Ogawa et al.

(10) Patent No.: US 10,412,675 B2
(45) Date of Patent: Sep. 10, 2019

(54) WIRELESS COMMUNICATION APPARATUS, PRINTING APPARATUS, AND CONTROL METHOD

(71) Applicant: SEIKO EPSON CORPORATION, Tokyo (JP)

(72) Inventors: Yohei Ogawa, Shiojiri (JP); Kenji Sakuda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/608,054

(22) Filed: May 30, 2017

(65) Prior Publication Data

US 2018/0020406 A1    Jan. 18, 2018

(30) Foreign Application Priority Data

Jul. 15, 2016    (JP) .................................. 2016-140490

(51) Int. Cl.
| | |
|---|---|
| *H04B 7/00* | (2006.01) |
| *H04W 52/02* | (2009.01) |
| *H04W 4/80* | (2018.01) |
| *H04W 8/00* | (2009.01) |

(52) U.S. Cl.
CPC ......... *H04W 52/0229* (2013.01); *H04W 4/80* (2018.02); *H04W 52/028* (2013.01); *H04W 52/0235* (2013.01); *H04W 8/005* (2013.01); *Y02D 70/00* (2018.01); *Y02D 70/10* (2018.01); *Y02D 70/14* (2018.01); *Y02D 70/142* (2018.01); *Y02D 70/144* (2018.01); *Y02D 70/166* (2018.01)

(58) Field of Classification Search
CPC . H04W 52/0229; H04W 4/008; H04W 8/005; H04W 52/0235
See application file for complete search history.

(56) References Cited

U.S. PATENT DOCUMENTS

| | | | |
|---|---|---|---|
| 2007/0073929 A1 | 3/2007 | Takayama et al. | |
| 2008/0166967 A1* | 7/2008 | McKillop | H04W 52/50 455/41.2 |
| 2008/0200166 A1* | 8/2008 | McCamon | H04W 48/16 455/426.1 |
| 2009/0052348 A1 | 2/2009 | Kato et al. | |

(Continued)

FOREIGN PATENT DOCUMENTS

| | | |
|---|---|---|
| JP | 2004-364145 | 12/2004 |
| JP | 2009-135865 | 6/2009 |

OTHER PUBLICATIONS

European Search Report issued in EP 17180446 dated Nov. 13, 2017.

*Primary Examiner* — Tuan Pham
(74) *Attorney, Agent, or Firm* — Workman Nydegger

(57) ABSTRACT

A wireless communication apparatus includes: a first wireless communication unit performing first wireless communication; a second wireless communication unit performing second wireless communication that consumes less power than the first wireless communication; and a control unit that switches between a first operation mode and a second operation mode consuming less power than the first operation mode. The control unit switches between the first operation mode and the second operation mode on a basis of a search result of searching for another apparatus performed in the second wireless communication.

14 Claims, 3 Drawing Sheets

(56) References Cited

U.S. PATENT DOCUMENTS

| | | | |
|---|---|---|---|
| 2009/0257374 A1* | 10/2009 | Cho | H04W 88/06 370/328 |
| 2011/0183614 A1* | 7/2011 | Tamura | H04M 1/7253 455/41.2 |
| 2012/0258662 A1 | 10/2012 | Takayama et al. | |
| 2012/0265913 A1* | 10/2012 | Suumaki | H04W 4/08 710/303 |
| 2014/0115202 A1* | 4/2014 | Yoshinaga | G06F 13/426 710/62 |
| 2014/0274033 A1* | 9/2014 | Smart | H04W 52/028 455/426.1 |
| 2014/0302849 A1 | 10/2014 | Palin et al. | |
| 2015/0171929 A1 | 6/2015 | Takayama et al. | |
| 2016/0127581 A1 | 5/2016 | Suzuki | |
| 2016/0165384 A1 | 6/2016 | Amano | |
| 2016/0182125 A1 | 6/2016 | Takayama et al. | |
| 2016/0295348 A1* | 10/2016 | Luna | G06F 17/30032 |
| 2017/0134593 A1* | 5/2017 | Kadoda | H04N 1/00082 |

* cited by examiner

WIRELESS COMMUNICATION APPARATUS, PRINTING APPARATUS, AND CONTROL METHOD

BACKGROUND

1. Technical Field

The present invention relates to a wireless communication apparatus such as a printer including a wireless communication function, and specifically relates to a wireless communication apparatus or the like that can efficiently suppress power consumption and that provides good user convenience.

2. Related Art

In recent years, there are many electronic apparatuses which have a power saving mode to suppress unnecessary power consumption, and consciousness about saving energy of electronic apparatuses is increasing. For example, there are many types of printers which are designed such that the operation mode is switched to a power saving mode when data to be printed is not received for a predetermined time.

On the other hand, recently, there is an increase in the number of environments which enable use of two wireless communication means such as Bluetooth (registered trademark) and near-field communication (NFC) when a print command is issued by, for example, a mobile terminal to a printing apparatus through wireless communication.

Examples of such technologies that use two wireless communication means include technologies disclosed in the following two patent documents.

JP-A-2009-135865 discloses a technique of a multifunction device in which when a mobile terminal apparatus exists within the communication range of an NFC communication unit, the mobile terminal apparatus transmits and receives data for establishing communication through non-contact communication. JP-A-2004-364145 proposes a technique that allows NFC communication to be switched to Bluetooth (registered trademark) communication (BT communication), in the case where BT communication is available between two communication apparatuses.

However, the patent documents described above do not propose means for efficiently suppress power consumption of an apparatus in the environment described above where the two wireless communication means are used.

Further, it is desired to realize energy saving while maintaining (without a decrease in) user convenience.

SUMMARY

An advantage of some aspects of the invention is to provide a wireless communication apparatus such as a printer including a wireless communication function, where the wireless communication apparatus allows power consumption to be efficiently suppressed while realizing good user convenience.

According to an aspect of the invention, a wireless communication apparatus includes: a first wireless communication unit performing first wireless communication; a second wireless communication unit performing second wireless communication that consumes less power than the first wireless communication; and a control unit that switches between a first operation mode and a second operation mode consuming less power than the first operation mode. The control unit switches between the first operation mode and the second operation mode on a basis of a search result of searching for another apparatus performed in the second wireless communication.

As a result, power consumption can be suppressed in accordance with a search result of searching for another apparatus performed in the second wireless communication.

Preferably, in this case, the second operation mode corresponds to a state in which the second wireless communication unit is operating and the first wireless communication unit is not operating, and the first operation mode corresponds to a state in which the first wireless communication unit is operating.

As a result, power consumption can be suppressed in the second operation mode.

Preferably, the first wireless communication unit includes a data communication unit that manages data communication based on the first wireless communication and a communication control unit that manages control of the data communication, and in the first operation mode, the communication control unit of the first wireless communication unit is made to operate.

As a result, by dividing the first wireless communication unit into two function units, i.e., the communication control unit and the data communication unit, within the first wireless communication unit, the function units which are made to operate or stopped can be finely controlled, and power consumption can be efficiently reduced.

Preferably, the data communication unit of the first wireless communication unit is made to operate when a request for connection from the other apparatus is received.

As a result, since the data communication unit is not made to operate until a request for connection is received from the other apparatus, unnecessary power consumption is suppressed.

Preferably, in a case in which the second wireless communication unit detects the other apparatus during the second operation mode, the control unit switches the second operation mode to the first operation mode.

As a result, since the first wireless communication unit is made to operate after the other apparatus likely to issue a request for processing has been detected, unnecessary power consumption can be suppressed. Further, since the first wireless communication unit is kept to operate until a request for processing arrives when the other apparatus has been detected, a start-up time at the time when the request for processing is received is made short.

Preferably, the control unit, on a basis of information regarding a distance to the detected apparatus, performs switching to the first operation mode.

As a result, when there is an apparatus that is likely to issue a request for processing and is located within a short distance from the wireless communication apparatus, switching to the first operation mode can be performed and unnecessary power consumption can be suppressed.

Preferably, the control unit performs switching to the first operation mode on a basis of whether or not an application provided in the detected apparatus is activated.

As a result, when an apparatus which has activated an application likely to issue a request for processing is detected, switching to the first operation mode can be performed and unnecessary power consumption can be suppressed.

Preferably, the control unit performs switching to the first operation mode on a basis of identification information of the detected apparatus.

As a result, when an apparatus which is likely to issue a request for processing and which has issued a request for processing to the wireless communication apparatus in the past is detected, switching to the first operation mode can be performed and unnecessary power consumption can be suppressed.

Preferably, the second wireless communication is based on Bluetooth Low Energy communication.

As a result, power consumption in the second operation mode can be considerably reduced.

Another aspect of the present invention is a printing apparatus including the wireless communication apparatus.

As a result, the present invention can be applied to a printing apparatus including the wireless communication apparatus, power consumption can be efficiently suppressed in the printing apparatus, and user convenience can be secured.

A still another aspect of the present invention is a control method for controlling a wireless communication apparatus including a first wireless communication unit performing first wireless communication and a second wireless communication unit performing second wireless communication that consumes less power than the first wireless communication. The first operation mode and the second operation mode are switched between on a basis of a search result of searching for another apparatus performed in the second wireless communication.

Further advantages and characteristics of the invention will be clarified by the exemplary embodiments described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. However, these embodiments will not limit the technological scope of the invention.

Figure 1:
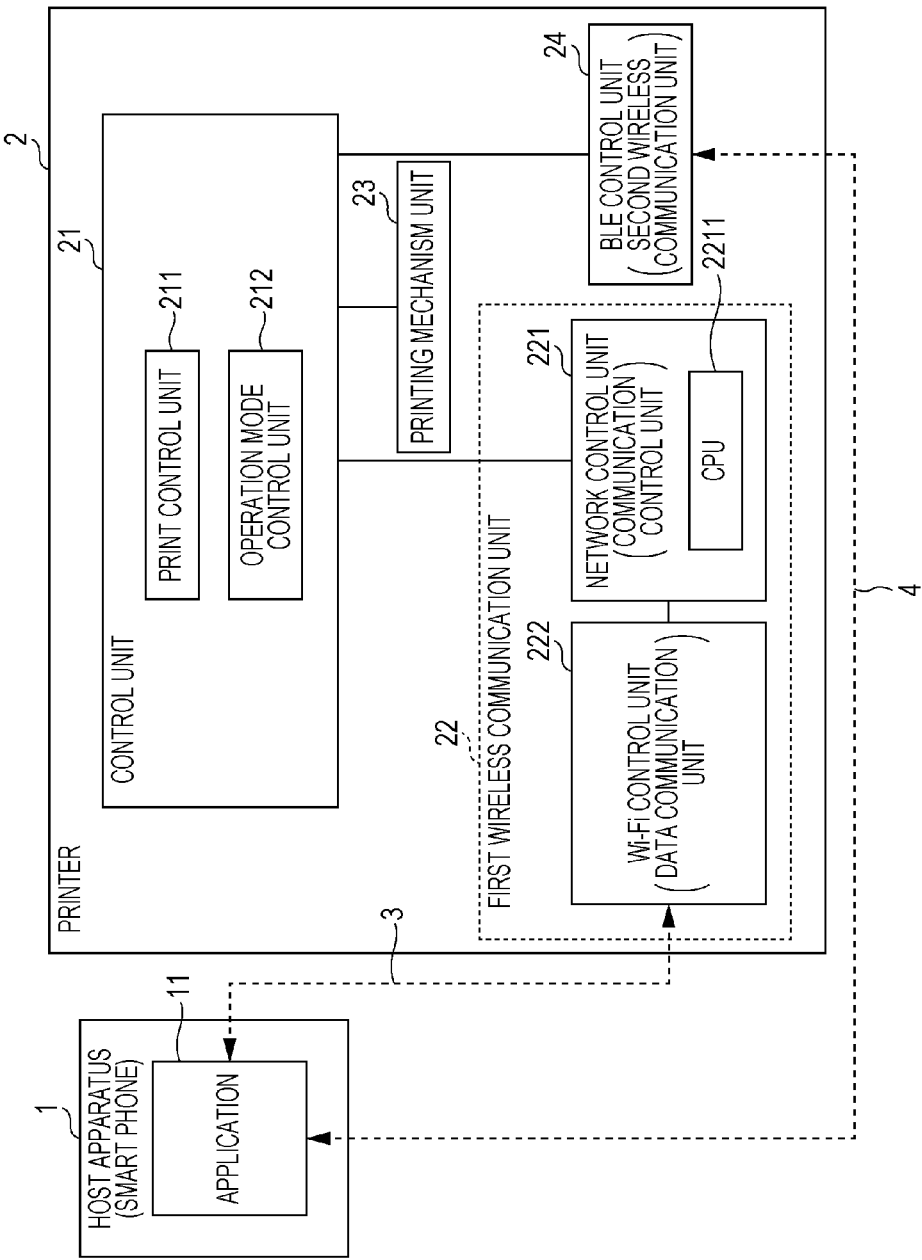
FIG. 1 is a configuration diagram according to an embodiment of a printing apparatus to which the invention is applied.

FIG. 1 is a system configuration diagram according to an embodiment of a printing apparatus to which the invention has been applied. A printer 2 illustrated in FIG. 1 is a printing apparatus including a wireless communication apparatus to which the invention has been applied. The printer 2 includes a first wireless communication unit 22 performing Wi-Fi (registered trademark) communication and a BLE (Bluetooth Low Energy) control unit 24 (second wireless communication unit) performing communication (second wireless communication based on BLE) which has lower power consumption than Wi-Fi communication 3 (first wireless communication). The printer 2 including these two communication units makes only the BLE control unit 24 of the two communication units operate in the case of a standby state where a request for processing does not come from other apparatuses. Further, it is determined whether a request for processing may arrive on the basis of communication (search) performed by the BLE control unit 24, and when the possibility of the request for processing is high, a network control unit 221 (communication control unit) of the first wireless communication unit 22 is made to operate before the request for processing arrives. As a result, power consumption in a waiting state can be effectively suppressed and, when a request for processing is received, the time required for the completion of connection can be reduced. Hence, user convenience can be maintained.

A printing system including the printing apparatus according to the present embodiment illustrated in FIG. 1 includes a host apparatus 1 and the printer 2 connected to each other through wireless communication.

The host apparatus 1 (a peripheral device, or another apparatus) is a host computer of the printer 2 which receives a request for processing from the host computer, and is an information terminal apparatus (mobile terminal apparatus) that is portable. For example, the host apparatus 1 may be a smart phone, a tablet terminal, or the like and includes a CPU, a RAM, a ROM, an HDD, a loud speaker, communication I/Fs, a display device, and an operation device (not illustrated), as hardware configuration components.

Note that, as illustrated in FIG. 1, the host apparatus 1 includes an application 11 and the like. The application 11 includes an application program that issues a request for processing to the printer 2. The application program of the application 11 is installed in the host apparatus 1 and becomes usable after having been downloaded from a predetermine site (for example, the home page of a printer manufacturer).

The host apparatus 1 has a function of performing Wi-Fi communication 3 and BLE communication 4 with the printer 2 through the communication I/Fs described above.

The printer 2 is a printer including a wireless communication function, and is, for example, an ink jet printer that performs printing by ejecting ink onto a print medium such as a sheet of paper. As illustrated in FIG. 1, the printer 2 includes a control unit 21, a printing mechanism unit 23, a first wireless communication unit 22, and the BLE control unit 24, as function configuration components.

The control unit 21, which is a unit that controls the portions of the printer 2, includes a CPU, a RAM, a ROM, an ASIC, an NVRAM, and the like, as hardware configuration components, although not illustrated. The control unit 21 includes a print control unit 211 and an operation mode control unit 212, as function configuration components.

The print control unit 211 is a unit that mainly controls print processing. At the time of printing, the print control unit 211 receives print data from the host apparatus 1 through the Wi-Fi communication 3 (first wireless communication), converts the data into data for the printing mechanism unit 23, and makes the printing mechanism unit 23 including a print head (not illustrated) perform printing using the data for the printing mechanism unit 23.

The operation mode control unit 212 is a unit that switches the operation mode provided in the printer 2. In the printer 2, two operation modes, i.e., a second operation mode (energy saving mode) and a first operation mode (normal mode) are provided. The details are described later.

Note that the print control unit 211 and the operation mode control unit 212 are formed of programs (firmware) stored in the ROM or the like of the printer 2, a CPU that performs processing in accordance with the programs, a RAM in which the programs and data to be processed are loaded, and the like (not illustrated). A processor that is the CPU or a circuit like an ASIC is corresponding to the print control unit 211 and the operation mode control unit 212.

The printing mechanism unit 23 is a unit that performs print processing for a sheet of paper in accordance with the instructions of the print control unit 211. The printing mechanism unit 23 includes a transport unit (not illustrated) transporting the sheet of paper, a print unit (not illustrated) that includes a print head and performs printing on the sheet of paper, and the like.

The first wireless communication unit 22 includes the network control unit 221 and a Wi-Fi control unit (data communication unit) 222 and is a circuit that performs the Wi-Fi communication 3 with an external apparatus. When performing printing, authentication processing (pairing processing) and transmission and reception of data such as print request data to and from the application 11 loaded in the host apparatus 1 are performed. The first wireless communication unit 22 includes the network control unit 221 and the Wi-Fi control unit 222.

The network control unit 221 is a unit that is in charge of control of network communication such as packet control. In the printer 2, data communication performed by the Wi-Fi control unit 222 inserted into the USB connector of the printer 2 is controlled.

Note that the network control unit 221 as a hardware configuration component is formed of a circuit and the like (Wi-Fi module) including a CPU 2211 described later, although not illustrated, and operates on the basis of firmware loaded in the circuit and the like. The network control unit 221 is a type of peripheral circuit of the Wi-Fi control unit 222.

The Wi-Fi control unit 222, which is connected to the network control unit 221 by USB, is a unit that manages the physical layer in data communication based on the Wi-Fi communication 3, and is a unit that operates when a request for connection is received from the host apparatus 1 or the like requesting for processing.

Note that the Wi-Fi control unit 222 includes a communication interface, an antenna, and the like as hardware configuration components.

The CPU 2211 is a CPU that controls processing regarding a network. The CPU 2211 is provided separately from the CPU provided in the printer 2 main body and is a CPU dedicated to network control.

The BLE control unit 24 is a circuit performing communication (BLE communication 4) based on BLE. The BLE control unit 24, upon receipt of a request for processing based on the Wi-Fi communication 3 from a peripheral apparatus such as the host apparatus 1, exchanges setting information with the peripheral apparatus (host apparatus 1) and performs the Wi-Fi communication 3. At the time of a second operation mode, the BLE control unit 24 operates and searches the vicinity of the printer 2 for an apparatus.

Note that the BLE control unit 24 includes an external interface enabling connection to a universal asynchronous receiver/transmitter (UART) and the like and an internal antenna and the like, as hardware configuration components.

The printer 2 having the configuration described above, has a first operation mode and a second operation mode as operation modes, which are described in detail, hereinafter.

First, the second operation mode is a power saving mode in the printer 2. Specifically, in this mode, a state is entered in which only the BLE control unit 24 of the two communication function units, i.e., the first wireless communication unit 22 and the BLE control unit 24, is operating and the operation of the first wireless communication unit 22 is stopped. In other words, this is a state in which power is supplied to the BLE control unit 24 and power is not supplied to the first wireless communication unit 22. In the printer 2, this operation mode is entered when a peripheral apparatus (host apparatus 1) which is likely to request processing does not exist in the vicinity of the printer 2.

Next, the first operation mode refers to a normal mode in the printer 2. In the case of the first operation mode, a state is entered in which the two communication function units of the first wireless communication unit 22 and the BLE control unit 24 are operating. In other words, this is a state in which power is supplied to both of the first wireless communication unit 22 and the BLE control unit 24. In the printer 2, this operation mode is entered in the case where there exists a peripheral apparatus (host apparatus 1) which is likely to request processing in the vicinity of the printer 2, and in the case where a request for processing has been received from the peripheral apparatus (host apparatus 1). In the case where a peripheral apparatus (host apparatus 1) which is likely to request processing exists in the vicinity of the printer 2, only the network control unit 221 of the first wireless communication unit 22 is made to operate and the Wi-Fi control unit 222 is not made to operate. On the other hand, when a request for processing is received from the peripheral apparatus (host apparatus 1), both of the network control unit 221 and the Wi-Fi control unit 222 are made to operate.

In the printer 2 in the present embodiment, switching between these two operation modes is performed on the basis of whether or not a peripheral apparatus (host apparatus 1) which is likely to request processing exists in the vicinity of the printer 2.

Figure 2:
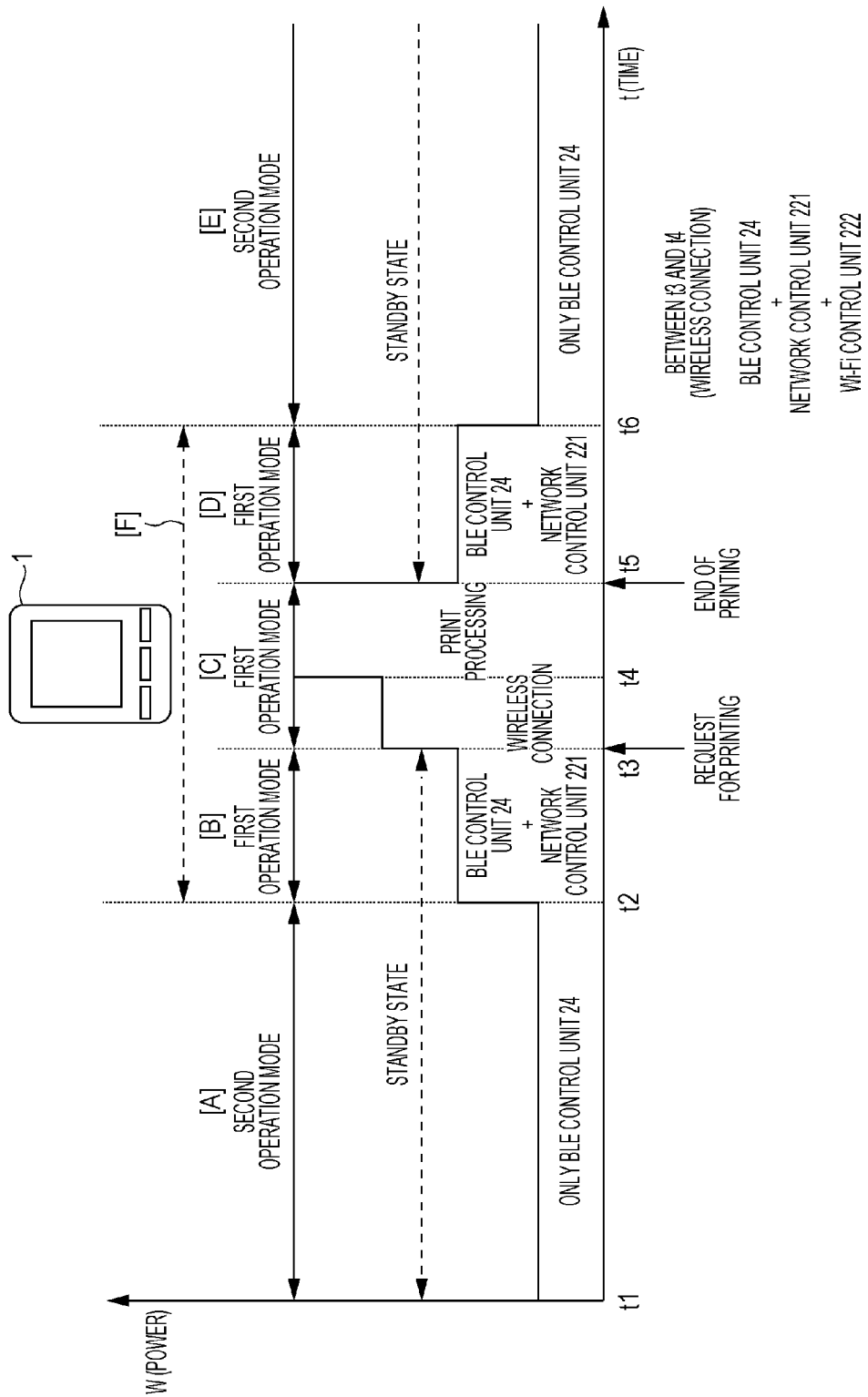
FIG. 2 illustrates the power consumption states of a printer in operation modes.

FIG. 2 illustrates the power consumption states of the printer 2 in the respective operation modes.

Referring to FIG. 2, the horizontal axis represents an elapsed time t and the vertical axis represents power consumption W in the printer 2. The time chart illustrated in FIG. 2 illustrates how the operation modes described above change in the following sequence of states: a state in which a peripheral apparatus (host apparatus 1) which is likely to request processing is detected in the vicinity of the printer 2, a state in which a request for processing (for example, a request for printing) is made, and a state in which it becomes unlikely that the peripheral apparatus (host apparatus 1) requests processing.

First, [A] (t1 to t2) in FIG. 2 shows that a peripheral apparatus (host apparatus 1) which is likely to request processing does not exist in the vicinity of the printer 2. At this time, the printer 2 enters a second operation mode. Hence, as described above, power is supplied to the BLE control unit 24, but power is not supplied to the network control unit 221 and the Wi-Fi control unit 222.

Next, at timing t2 in FIG. 2, when a peripheral apparatus (host apparatus 1) which is likely to request processing is detected in the vicinity of the printer 2, the network control unit 221 is activated and the printer 2 enters the first operation mode described above ([B] in FIG. 2).

Next, at timing t3 in FIG. 2, when a request for connection based on the Wi-Fi communication 3 or a request for printing is received from the peripheral apparatus (host apparatus 1) through BLE communication, the Wi-Fi control unit 222 enters an on state (a state where power is supplied) in the first operation mode.

Further, print processing is performed at timing t4 in FIG. 2, and when print processing ends at timing t5, the Wi-Fi control unit 222 enters an off state (power supply ends).

When more time has elapsed and a peripheral apparatus (host apparatus 1) which is likely to request processing is not detected any more, the printer 2 makes the network control unit 221 be in an off state and the second mode is entered again ([E] in FIG. 2 (t6 and later)).

In short, during the periods [F] ([B], [C], and [D]) in FIG. 2, since a peripheral apparatus (host apparatus 1) which is likely to request processing exists in the vicinity of the printer 2, the first operation mode is entered and the Wi-Fi control unit 222 operates upon receipt of the request for processing.

The printer 2 including the operation modes described above is characterized by operation mode switching determination and switching processing based on the determination, which will be described below.

First, the printer 2 determines switching of the operation mode on the basis of whether or not a peripheral apparatus (host apparatus 1) which is likely to request processing to be performed by the printer 2 exists. More specifically, determination can be performed using four determination methods ((1)-(4)) described below.

First, in determination method (1), the operation mode is switched on the basis of whether or not a peripheral apparatus (host apparatus 1) can be detected through BLE communication. In other words, when a peripheral apparatus (host apparatus 1) can be detected, it can be determined that a peripheral apparatus (host apparatus 1) which is likely to request processing exists. Specifically, this is a method in which determination is made on the basis of whether or not a peripheral apparatus (host apparatus 1) exists in the vicinity of the printer 2 by detecting, using the BLE control unit 24, a BLE beacon generated by the peripheral apparatus (host apparatus 1).

In determination method (2), the operation mode is switched on the basis of whether or not the application 11 provided in a detected peripheral apparatus (host apparatus 1) has been activated. In other words, when the application 11 of the detected peripheral apparatus (host apparatus 1) has been activated, it can be determined that a peripheral apparatus (host apparatus 1) which is likely to request processing exists.

Further, in determination method (3), the operation mode is switched on the basis of the identification information of a detected peripheral apparatus (host apparatus 1). Specifically, it is determined whether or not the identification information (for example, a MAC address) of the peripheral apparatus (host apparatus 1) has been recorded in the printer 2 as print history information, and if the identification information has been recorded, it is determined that a peripheral apparatus (host apparatus 1) which is likely to request processing exists.

Further, in determination method (4), the operation mode is switched on the basis of information regarding a distance to the detected peripheral apparatus (host apparatus 1). Specifically, determination is made on the basis of information regarding a distance computed from the value of radio signal strength indication (RSSI) obtained by the BLE control unit 24. In other words, when the computed distance is shorter than a predetermined distance, it is determined that a peripheral apparatus (host apparatus 1) which is likely to request processing exists.

The determination methods described above ((1)-(4)) may be used individually or in any combination thereof.

Figure 3:
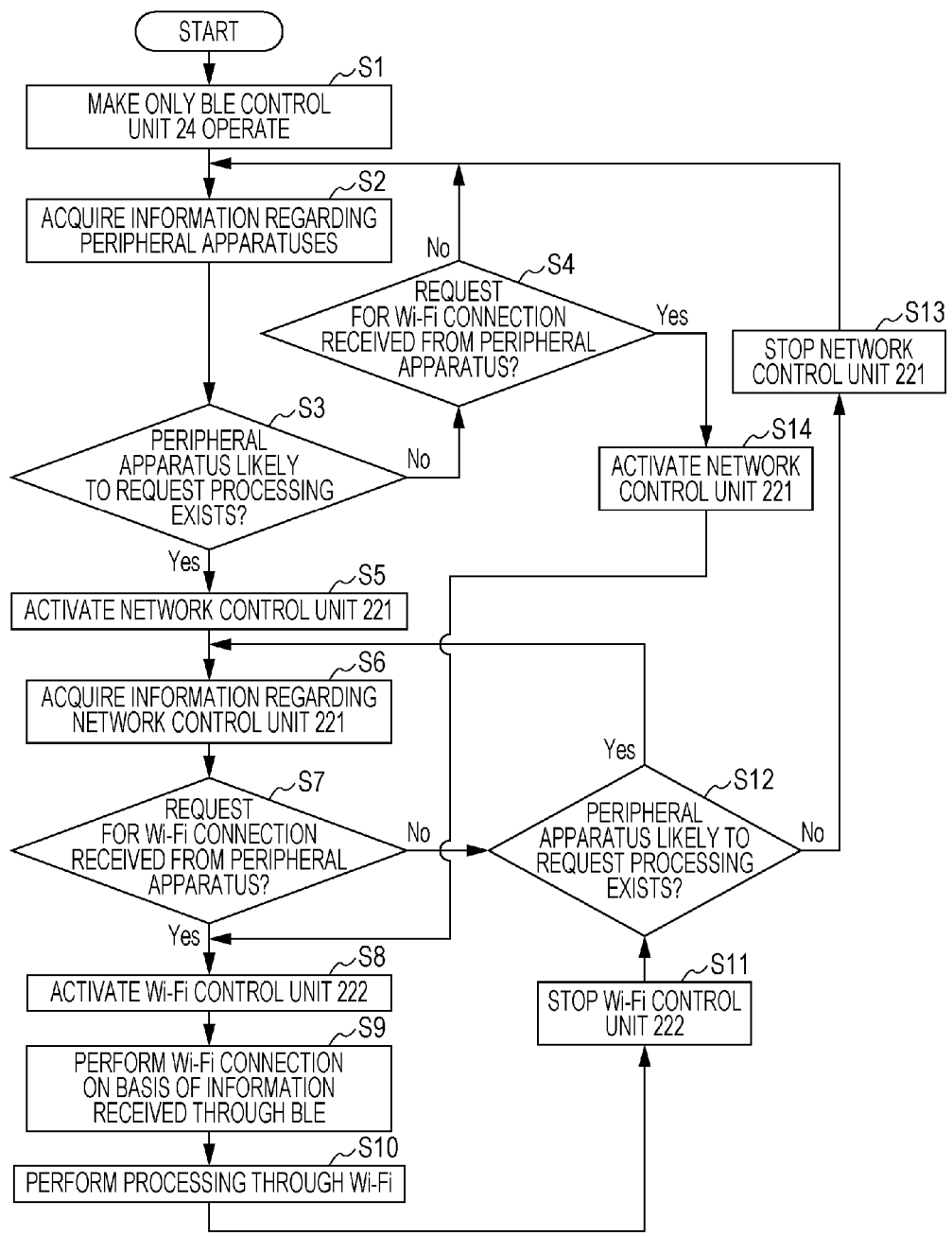
FIG. 3 is a flowchart illustrating the steps of operation mode switching processing in the printer.

FIG. 3 is a flowchart illustrating the steps of operation mode switching processing in the printer 2. On the basis of FIG. 3, description will be made regarding content of processing of the operation mode control unit 212 after the printer 2 has been powered on.

First, when the printer 2 is powered on, the operation mode control unit 212 makes only the BLE control unit 24 operate as a communication function unit (step S1 in FIG. 3). In other words, the second-operation-mode state is entered. This is a state in which power consumption is suppressed, for example, state [A] in FIG. 2.

In this state, the operation mode control unit 212, at predetermined time intervals, performs acquisition of information (step S2 in FIG. 3) regarding the peripheral apparatus (host apparatus 1), through the BLE control unit 24, and performs determination on the basis of the acquired information, that is, determination (step S3 in FIG. 3) whether or not a peripheral apparatus (host apparatus 1) which is likely to request processing (for example, request printing) exists.

Specifically, different determinations are performed in the four determination methods ((1)-(4)) described above.

In the case of the determination method (1), the BLE beacon of a peripheral apparatus (host apparatus 1) is acquired by the BLE control unit 24. When the BLE beacon was able to be acquired, the operation mode control unit 212 determines that a peripheral apparatus (host apparatus 1) likely to request processing exists (Yes in step S3 in FIG. 3). On the other hand, when the BLE beacon was not able to be acquired, the flow proceeds to step S4 (No in step S3 in FIG. 3).

In the case of the determination method (2), the operation mode control unit 212 acquires information regarding whether or not the application 11 of a peripheral apparatus (host apparatus 1) has been activated from the peripheral apparatus (host apparatus 1) capable of performing BLE communication. When the acquired information indicates that the application 11 has been activated, it is determined that a peripheral apparatus (host apparatus 1) likely to request processing exists (Yes in step S3 in FIG. 3). On the other hand, when the application 11 has not been activated, the flow proceeds to step S4 (No in step S3 in FIG. 3).

In the case of the determination method (3), the operation mode control unit 212 acquires, from a peripheral apparatus (host apparatus 1) that can perform BLE communication, the identification information (MAC address) of the peripheral apparatus (host apparatus 1) included in a BLE beacon generated by the peripheral apparatus (host apparatus 1), and when the acquired identification information is included in the print history information recorded in the printer 2, determines that a peripheral apparatus (host apparatus 1) likely to request processing exists (Yes in step S3 in FIG. 3). On the other hand, when the identification information (MAC address) is not included in the print history information, the flow proceeds to step S4 (No in step S3 in FIG. 3).

In the case of the determination method (4), the operation mode control unit 212 acquires the value of the radio signal strength indication (RSSI) of the BLE beacon generated by a peripheral apparatus (host apparatus 1), obtains (calculates) a distance on the basis of the acquired value of the radio signal strength indication (RSSI). When the obtained (calculated) distance is smaller than a predetermined distance, it is determined that a peripheral apparatus (host apparatus 1) likely to issue a request for processing exists (Yes in step S3 in FIG. 3). On the other hand, when the obtained distance is longer than the predetermined distance, the flow proceeds to step S4 (No in step S3 in FIG. 3).

Next, in any of the determination methods, when it is determined that a peripheral apparatus (host apparatus 1) likely to request processing exists (Yes in step S3 in FIG. 3), the operation mode control unit 212 activates the network control unit 221 by supplying power (step S5 in FIG. 3). In other words, the operation mode control unit 212 activates the peripheral circuit and the first operation mode is entered. For example, the state denoted by [B] in FIG. 2 is entered.

Next, in the state of the first operation mode, the operation mode control unit 212, at predetermined time intervals, acquires information regarding a peripheral apparatus (host apparatus 1) (step S6 in FIG. 3) and determines whether or not a request for Wi-Fi connection has been received (step S7 in FIG. 3).

In acquisition of information regarding a peripheral apparatus (host apparatus 1), the operation mode control unit 212 acquires information regarding whether or not the BLE control unit 24 has received a request for Wi-Fi connection (step S6 in FIG. 3). Together with this, the operation mode control unit 212 acquires information similar to that in step S2 in accordance with the determination methods ((1)-(4)) used.

Here, when a request for connection is received from the peripheral apparatus (host apparatus 1) through the BLE communication 4 (Yes in step S7 in FIG. 3), the operation mode control unit 212 supplies power to the Wi-Fi control unit 222 and activates it (step S8 in FIG. 3). At this time, the printer 2 enters the first operation mode in which power is supplied to the Wi-Fi control unit 222, as denoted by [C] in FIG. 2, for example.

The operation mode control unit 212, through the BLE communication 4 performed by the BLE control unit 24, acquires setting information of the peripheral apparatus (host apparatus 1), which has requested connection, for the Wi-Fi communication 3 and delivers it to the Wi-Fi control unit 222.

The Wi-Fi control unit 222, on the basis of the setting information, performs Wi-Fi connection with the peripheral apparatus (host apparatus 1) (step S9 in FIG. 3). In other words, the printer 2 enters a state in which communication using the Wi-Fi communication 3 is possible, by performing authentication (pairing processing) for the peripheral apparatus (host apparatus 1).

In this way, when the Wi-Fi connection is completed, in accordance with a request for processing from the peripheral apparatus (host apparatus 1), processing (for example, print processing) requested through Wi-Fi is performed (step S10 in FIG. 3).

The Wi-Fi control unit 222 receives a request for printing from the peripheral apparatus (host apparatus 1) through the Wi-Fi communication 3, the print control unit 211 controls the printing mechanism unit 23 on the basis of the received request for printing, and the requested printing is performed (step S10 in FIG. 3).

In this way, when the requested processing is completed, the operation mode control unit 212 stops the operation of the Wi-Fi control unit 222 (step S11 in FIG. 3). For example, the state denoted by [D] in FIG. 2 is entered.

After that, the operation mode control unit 212, by using the information acquired in step S6, similarly to step S3, determines whether or not a peripheral apparatus (host apparatus 1) likely to request processing still exists (step S12 in FIG. 3), using the determination methods ((1) to (4)). When it is determined that there is another peripheral apparatus (host apparatus 1) likely to request processing (Yes in step S12 in FIG. 3), the flow returns to step S6, and the operation mode control unit 212, in the first-operation-mode state, at predetermined time intervals, acquires information regarding the peripheral apparatus (host apparatus 1) (step S6 in FIG. 3) and determines whether or not a request for Wi-Fi connection has been received (step S7 in FIG. 3). Hereinafter, processing similar to that described above is performed.

When it is determined that a peripheral apparatus (host apparatus 1) likely to request processing does not exist (No in step S12 in FIG. 3), the operation mode control unit 212 stops the operation of the network control unit 221 (step S13 in FIG. 3), and the second operation mode is entered. For example, the state denoted by [E] in FIG. 2 is entered. After that, the flow returns to step S2, and processing similar to that described above is performed.

Next, going back to step S3, when it is determined that a peripheral apparatus (host apparatus 1) likely to request processing does not exist (No in step S3 in FIG. 3), the flow returns to step S2 in principle. However, in the case of the determination methods (3) and (4), a request for Wi-Fi connection may be received in this state from a peripheral apparatus (host apparatus 1) and, hence, the operation mode control unit 212 determines whether or not a request for Wi-Fi connection has been received from a peripheral apparatus (host apparatus 1) (step S4 in FIG. 3).

When a request for Wi-Fi connection is not received, as described above, the flow goes back to step S2 (No in step S4 in FIG. 3). On the other hand, when a request for Wi-Fi connection has been received (Yes in step S4 in FIG. 3), the operation mode control unit 212 activates the network control unit 221, and the first operation mode is entered (step S14 in FIG. 3). After that, the flow proceeds to step S8, and hereinafter, processing similar to that described above is performed. In other words, in this case, since a request for connection (request for processing) has been received although it was not determined that a request for processing is likely to be made, the network control unit 221 and the Wi-Fi control unit 222 are activated immediately to support this situation. For example, specifically, in the case where the determination method (3) is being used, processing like this is performed in the case where a request for printing is received from a peripheral apparatus (host apparatus 1) for which printing by the printer 2 has not been performed, that is, in the case where the peripheral apparatus (host apparatus 1) has identification information that is not recorded in the print history information.

As described above, the printer 2 processes a request for processing received from a peripheral apparatus (host apparatus 1) by switching between the two operation modes.

As described above, in the printer 2, in the case of the second operation mode in which a request for processing does not arrive, only the BLE control unit 24 is made to operate among the two communication units, i.e., the first wireless communication unit 22 and the BLE control unit 24. Further, the possibility that a request for processing is made on the basis of communication performed by the BLE control unit 24 is determined and, when the possibility is high, the network control unit 221 of the first wireless communication unit 22, i.e., the peripheral circuit is made to operate before the request for processing arrives.

As a result, only the second wireless communication unit is always made to function, enabling efficient suppression of power consumption during waiting time when a request for processing does not arrive.

Further, since the first wireless communication unit 22 is made to operate at the time when a peripheral apparatus (host apparatus 1) is detected even before a request for processing arrives, start-up processing at the time when the request for processing arrives can be performed quickly without diminishing user convenience.

Further, the printer 2 includes, in the first wireless communication unit 22, the Wi-Fi control unit 222 that manages data communication based on Wi-Fi communication and the network control unit 221 that manages data communication. Even in the first operation mode, only the network control unit 221 is powered on in the first wireless communication unit 22 until a request for processing such as a request for connection or printing is received. In this way, since the first wireless communication unit 22 is divided functionally into two units, i.e., the Wi-Fi control unit 222 and the network control unit 221, functions which are enabled or stopped are controlled in detail within the first wireless communication unit 22, and power consumption can be efficiently reduced.

The Wi-Fi control unit 222 is powered on and starts to operate when a request for connection (request for processing) is received from a peripheral apparatus (host apparatus 1). Hence, the Wi-Fi control unit 222 is not made to operate until a request for connection is received from the peripheral apparatus (host apparatus 1), whereby unnecessary power consumption can be suppressed.

Further, during the second operation mode, when the BLE control unit 24 has detected a peripheral apparatus (host apparatus 1), the operation mode control unit 212 switches the second operation mode to the first operation mode. Hence, a peripheral apparatus (host apparatus 1) which is likely to request processing can be accurately determined.

Further, by employing the determination method (4), a peripheral apparatus (host apparatus 1) that is likely to request processing can be more accurately determined on the basis of the distance between the printer 2 and the peripheral apparatus (host apparatus 1).

Further, when the determination method (2) described above is used, a peripheral apparatus (host apparatus 1) likely to request processing can be more accurately determined on the basis of whether or not the application 11 requesting printing is activated.

Further, when the determination method (3) described above is used, since determination is made on the basis of the identification information (MAC address or the like) of the peripheral apparatus (host apparatus 1) recorded in the printer 2, a print history of the printer 2 is taken into consideration and, hence, a peripheral apparatus (host apparatus 1) likely to request processing can be accurately determined.

Further, by employing the BLE communication 4 as the second communication means, power consumption in the second operation mode can be considerably reduced.

Note that although the printer 2 employs an ink jet method as a printing method, a printer employing other printing methods such as a thermal method, an electro-photographic method, and the like may be used.

Although the electronic apparatus including the wireless communication function is a printer in the embodiment, the invention can be applied to other electronic apparatuses (for example, a multifunction peripheral, a scanner, and a projector) including a similar wireless communication function.

The protected scope of the invention is not limited to the embodiments described above, and covers the equivalents of the invention described in the Claims.

The entire disclosure of Japanese Patent Application No. 2016-140490, filed Jul. 15, 2016 is expressly incorporated by reference herein.

What is claimed is:

1. A wireless communication apparatus comprising:
a first wireless communication unit performing first wireless communication;
a second wireless communication unit performing second wireless communication that consumes less power than the first wireless communication; and
a control unit that switches between a first operation mode and a second operation mode consuming less power than the first operation mode,
wherein in a case in which the second wireless communication unit detects an apparatus during the second operation mode and receives an identification information that identifies the detected apparatus from other detected apparatuses, the control unit determines whether the detected apparatus is likely to request processing based on a usage history of functions of the wireless communication apparatus stored in the wireless communication apparatus, wherein the control unit switches from the second operation mode to the first operation mode, only after determining, based on the identification information received by the second wireless communication unit during the second wireless communication that the identification information of the detected apparatus is recorded in the usage history and that the detected apparatus has previously requested processing from the wireless communication apparatus.

2. The wireless communication apparatus according to claim 1,
wherein the second operation mode corresponds to a state in which the second wireless communication unit is operating and the first wireless communication unit is not operating, and
wherein the first operation mode corresponds to a state in which the first wireless communication unit is operating.

3. The wireless communication apparatus according to claim 2,
wherein the first wireless communication unit includes a data communication unit that manages the first wireless communication on a physical layer and a communication control unit that manages a network communication through the first wireless communication, and
wherein, in the first operation mode, the communication control unit is made to operate.

4. The wireless communication apparatus according to claim 3,
wherein the communication control unit of the first wireless communication unit is made to operate when a request for connection from the other apparatus is received.

5. The wireless communication apparatus according to claim 1,
wherein the control unit, on a basis of information regarding a distance to the detected apparatus, performs switching to the first operation mode.

6. The wireless communication apparatus according to claim 1,
wherein the control unit performs switching to the first operation mode on a basis of whether or not an application provided in the detected apparatus is activated, wherein the application is configured to request processing by the wireless communication apparatus.

7. The wireless communication apparatus according to claim 1,
wherein the second wireless communication is based on Bluetooth Low Energy communication.

8. A printing apparatus including the wireless communication apparatus according to claim 1.

9. A control method for controlling a wireless communication apparatus including a first wireless communication unit performing first wireless communication and a second wireless communication unit performing second wireless communication that consumes less power than the first wireless communication, the method comprising:
- detecting an apparatus during the second operation mode and receiving identification information that identifies the another detected apparatus from other detected apparatuses;
- determining whether the detected apparatus is likely to request processing based on whether the identification information is recorded in a usage history of functions of the wireless communication apparatus;
- switching between the first operation mode and the second operation mode based on the identification information only after determining during the second wireless communication that the detected apparatus is recorded in the usage history and that the detected apparatus has previously requested processing from the wireless communication apparatus; and
- maintaining the wireless communication apparatus initially in a standby state following switching between the second operation mode and the first operation mode.

10. The wireless communication apparatus according to claim 2, wherein the first wireless communication unit includes a data communication unit that manages the first wireless communication on a physical layer and a communication control unit that manages a network communication through the first wireless communication, and
wherein, in the standby state, the communication control unit is made to operate, and the data communication unit is not made to operate.

11. The wireless communication apparatus of claim 1, wherein the usage history comprises a print history.

12. The control method of claim 9, wherein the usage history comprises a print history.

13. The wireless communication apparatus of claim 1, wherein the control unit switches to the first operation mode after receiving a subsequent request for a connection using the first operation mode when the identification information is not stored in the usage history.

14. The control method of claim 9, wherein, when the identification information is not stored in the usage history, switching to the first operation mode only after receiving a subsequent request for a connection using the first operation mode.

* * * * *